US009141646B1

(12) United States Patent
Shatdal (10) Patent No.: US 9,141,646 B1
(45) Date of Patent: Sep. 22, 2015

(54) DATABASE REDISTRIBUTION IN DYNAMICALLY-CONFIGURED DATABASE SYSTEMS

(75) Inventor: Ambuj Shatdal, Ukiah, CA (US)

(73) Assignee: Teradata US, Inc., Dayton, OH (US)

( * ) Notice: Subject to any disclaimer, the term of this patent is extended or adjusted under 35 U.S.C. 154(b) by 426 days.

(21) Appl. No.: 13/341,889

(22) Filed: Dec. 30, 2011

(51) Int. Cl.
*G06F 17/30* (2006.01)

(52) U.S. Cl.
CPC .............................. *G06F 17/30289* (2013.01)

(58) Field of Classification Search
CPC ............... G06F 17/30289; G06F 17/30292; G06F 17/30091; G06F 17/30312; G06F 17/30595; G06F 17/30345; G06F 17/30386
USPC .......................................................... 707/803
See application file for complete search history.

(56) References Cited

U.S. PATENT DOCUMENTS

| | | | | |
|---|---|---|---|---|
| 5,557,791 A * | 9/1996 | Cheng et al. ........................ | 1/1 |
| 5,574,900 A * | 11/1996 | Huang et al. ........................ | 1/1 |
| 5,765,146 A * | 6/1998 | Wolf et al. ........................ | 1/1 |
| 5,797,000 A * | 8/1998 | Bhattacharya et al. ....... | 707/764 |
| 6,009,265 A * | 12/1999 | Huang et al. ........................ | 1/1 |
| 6,092,062 A * | 7/2000 | Lohman et al. ........................ | 1/1 |
| 6,112,198 A * | 8/2000 | Lohman et al. ........................ | 1/1 |
| 6,345,267 B1 * | 2/2002 | Lohman et al. ........................ | 1/1 |
| 6,505,189 B1 * | 1/2003 | On Au et al. ........................ | 1/1 |
| 7,035,851 B1 * | 4/2006 | Sinclair et al. ........................ | 1/1 |
| 7,299,468 B2 * | 11/2007 | Casey et al. .................... | 718/104 |
| 7,739,308 B2 * | 6/2010 | Baffier et al. .................. | 707/802 |
| 7,801,848 B2 * | 9/2010 | Hazlewood et al. .......... | 707/609 |
| 8,150,836 B2 * | 4/2012 | Xu et al. ......................... | 707/714 |
| 8,176,497 B2 * | 5/2012 | Yang et al. ..................... | 718/108 |
| 8,386,540 B1 * | 2/2013 | McAlister et al. ............. | 707/899 |
| 2001/0047482 A1 * | 11/2001 | Harris et al. ................... | 713/200 |
| 2002/0013802 A1 * | 1/2002 | Mori et al. ......................... | 709/1 |
| 2004/0022237 A1 * | 2/2004 | Elliott et al. .................... | 370/356 |
| 2004/0221290 A1 * | 11/2004 | Casey et al. ................... | 718/104 |
| 2005/0050050 A1 * | 3/2005 | Kawamura ..................... | 707/100 |
| 2006/0069761 A1 * | 3/2006 | Singh et al. .................... | 709/222 |
| 2007/0022133 A1 * | 1/2007 | Barghouthi .................... | 707/102 |
| 2007/0033578 A1 * | 2/2007 | Arnold et al. .................. | 717/130 |
| 2007/0143380 A1 * | 6/2007 | Plow et al. ..................... | 707/206 |
| 2007/0143753 A1 * | 6/2007 | Vasile .............................. | 718/1 |
| 2009/0183152 A1 * | 7/2009 | Yang et al. ......................... | 718/1 |
| 2009/0265306 A1 * | 10/2009 | Barsness et al. ................. | 707/2 |
| 2010/0082540 A1 * | 4/2010 | Isaacson et al. .............. | 707/624 |

* cited by examiner

*Primary Examiner* — Sheree Brown
(74) *Attorney, Agent, or Firm* — Randy L. Campbell, Jr.

(57) ABSTRACT

A database system may implement resource management for redistribution of stored database information in additional database resources. Resource management may include detection of the presence of additional database resources, such as storage and processing resources. Based on conditions associated with the additional resources and database information selected for potential redistribution, resource management may include a determination as to whether or not redistribution of the database information is to be performed. Resource management may include a cost-benefit analysis to determine if redistribution of database information is to be performed. The cost-benefit analysis may be based on factors related to both the additional resources and the database information being considered for redistribution.

20 Claims, 5 Drawing Sheets

DATABASE REDISTRIBUTION IN DYNAMICALLY-CONFIGURED DATABASE SYSTEMS

BACKGROUND

1. Technical Field

The present disclosure relates generally to database information distribution, and more particularly to, distribution of database information in dynamic database system configurations.

2. Related Art

A database is a collection of stored data that is logically related and that is accessible by one or more users or applications. In some database implementations, the amount of information needed for storage and processing may be cyclical in nature such that additional resources may be required for storage and accessing during different periods of time. Database flexibility allows additional resources to be added or removed to accommodate this cyclical nature.

In addressing the need for greater database capacity both for processing and storage, additional resources may be added. However, the addition of resources requires decisions to be made regarding the redistribution of previously-stored database information. For example, each database table should be analyzed to determine if redistribution should be performed. Redistribution of database resources also comes with associated costs regarding the use of the database for the actual redistribution of data. Also, in instances where the addition of resources is temporary, costs of re-redistributing the data prior to the removal of the additional resources may also require consideration. Thus, considerations regarding both the use of data being considered for redistribution and the costs of the actual data redistribution must be accounted for in order to make proper decisions regarding database usage efficiency.

SUMMARY

According to one aspect of the disclosure, a database system may implement resource management for redistribution of stored database information in additional database resources. In one example, resource management may include detection of the presence of additional database resources, such as storage and processing resources. Based on conditions associated with the additional resources and database information selected for potential redistribution, the resource management may include a determination as to whether or not redistribution of the database information is to be performed.

According to another aspect of the disclosure, resource management may include a cost-benefit analysis to determine if redistribution of database information is to be performed. The database information may be redistributed when the benefit of redistribution is determined to be greater than the cost.

According to another aspect of the disclosure, the cost-benefit analysis may be associated with the access frequency of the database information under consideration for redistribution as well as the amount of original database resources and the total amount of database resources including the additional database resources. The cost-benefit analysis may also include consideration of other factors related to both the additional resources and the database information being considered for redistribution.

The aspects of the disclosure may be implemented in systems, a methods, or on computer-readable media separately or various combinations thereof.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE FIGURES

A database management system may determine an adjustment in available resources. Adjustments may include both the addition and removal of database resources. Upon detection of the addition of resources, the database management system may determine if currently-existing database entities (e.g., tables, indices, etc.) are candidates for redistribution to the additional resources. Viable candidate entities for redistribution may be redistributed based on characteristics of both the additional resources and the candidate entities.

Figure 1:
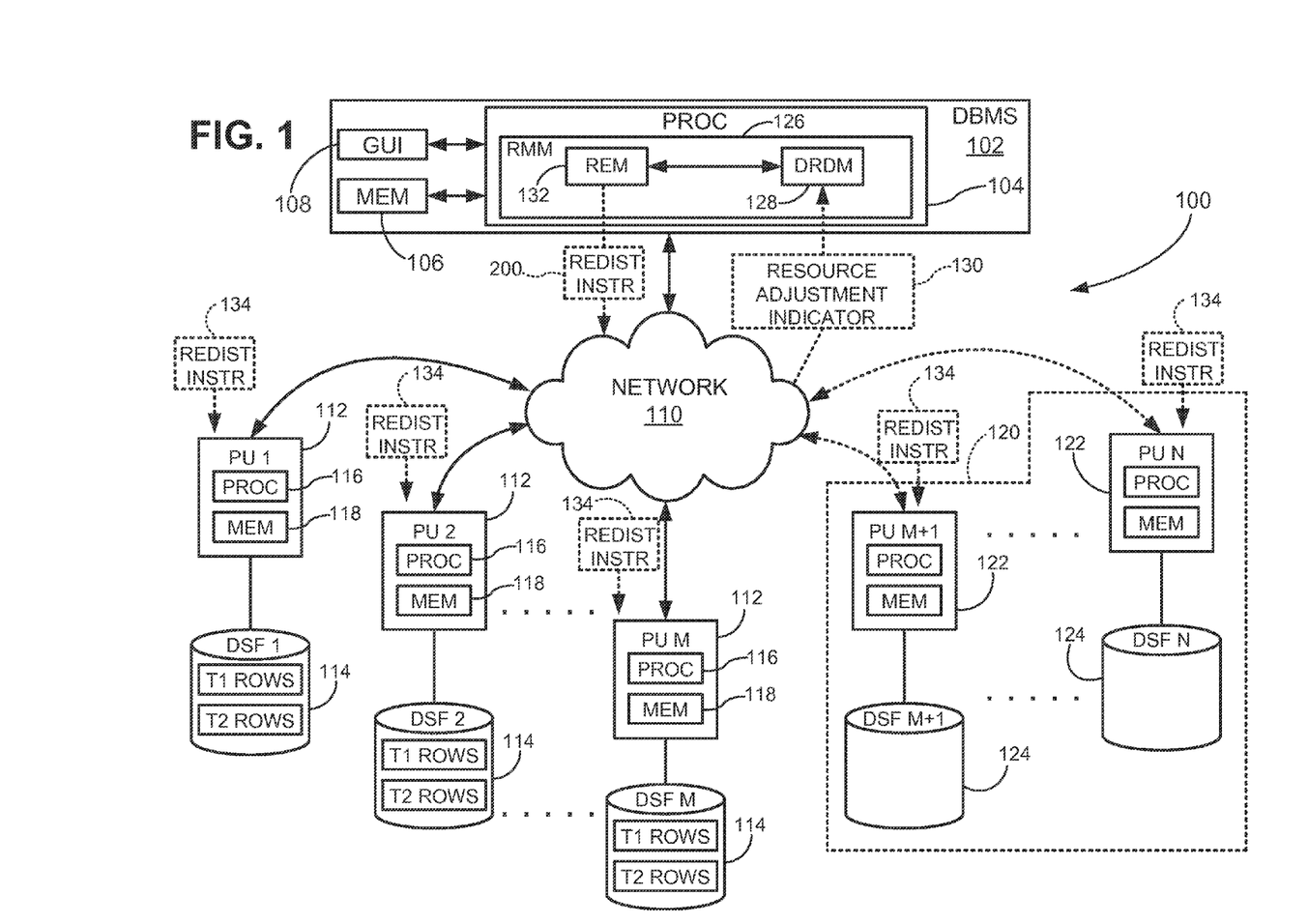
FIG. 1 is a block diagram of an example database system.

FIG. 1 is a block diagram of a database system 100. The database system 100 includes a database management system (DBMS) 102. In one example, the DBMS 102 may include one or more processors 104 and memories 106. The DBMS 102 may also include one or more graphical user interfaces (GUIs) 108 to receive input and to provide output. The GUIs 108 may include a display and one or more suitable input devices, such as keyboard, mouse, touchscreen display, and voice command recognition, for example, in communication with the processor 104.

During operation the DBMS 100 may communicate through a network 110 to a plurality of processing units (PU) 112. Each processing unit 112 is individually designated as "PU x" with x referring to the particular processing unit 112, such as PU 1 in FIG. 1. The database system 100 may include a number M processing units 112, which may be used to process database information, such as data retrieval, data manipulation, data storage, etc. Each processing unit 112 may be associated with data storage facilities (DSFs) 114. Each data storage facility 114 is individually designated as "DSF x" with x referring to the particular data storage facility 114, such as DSF 1 in FIG. 1. The DSFs 114 may represent data storage used exclusively or non-exclusively by the corresponding processing unit 112, e.g., PU 1 corresponds to DSF 1.

In the configuration shown in FIG. 1, each processing unit 112 may include one or more processors 116 and memory 118. Each of the processing units 112 may store data associated with a common database table. For example, the DBMS 102 may be a relational database management system (RBDMS) that includes relational tables, also referred to as relations, made up of rows and columns (also referred to as tuples and attributes). Each row represents an occurrence of an entity defined by a table, with an entity being a person, place, thing, or other object about which the table contains information. In such as system, each of the processing units PU 1, PU2, and PU 3 may each store a portion of table T1 and table T2 according to a row-partitioning protocol. In one example, the DSF 114 may be exclusively used by the corresponding processing unit 112. In such a "shared nothing" configuration, only the corresponding processing units 112 are authorized to retrieve and process the database information stored in the corresponding DSF 114. The distributed arrangement of database information allows each processing unit 112 to act independently and/or in parallel processing data included in the corresponding DSFs 114.

In one example, the DSFs 114 of FIG. 1 may be virtual disks (vdisks). The term "virtual disks" may refer to specific groups of memory locations distributed across physical memory devices, such as flash drives, hard drives, or some combination thereof, for example. In one example, the parallel processing aspect of the DBMS 102 may implement the shared nothing functionality that allocates specific memory locations to each individual processing unit 112. The specific memory locations may exist in a single physical memory device or be distributed among various physical memory devices. In one example, the allocated memory locations may be exclusively associated with an individual processing unit 112 such that no processing units 112 are given access to memory locations allocated to other processing units 112 during operation of the database system 100. Thus, for purposes of illustration in FIG. 1, each data-storage facility 114 may include the memory locations allocated to the access modules 110 of the associated processing node 106.

In storing tables making up a database, the database system 100 may use row partitioning, such that each table is broken down into rows and stored across the data-storage facilities 112. Row partitioning may be used in conjunction with the shared-nothing functionality such that each processing unit 112 is responsible for accessing only the rows of stored tables in the specifically-allocated memory locations. For example, each data storage facility 112 is shown in FIG. 1 as storing rows for tables 1 and 2.

The database system 100 may experience an equipment upgrade that provides additional resources 120. Upgrades may be permanent or temporary in nature, with temporary upgrades referring to adding resources with the intention to remove the additional resources after some desired length of time. As an example, in FIG. 1, additional processing units PU M+1 through PU N are added, where N>M. Corresponding data storage facilities DSF M+1 through DSF N may also be added. The addition of the data storage facilities DSF M+1 through DSF N may include either the addition of new physical memory, allocation of memory included in the other DSFs 114, or some combination thereof. In the scenario where the additional DSFs 124 associated with the additional processing units 122 are re-allocated memory from existing DSFs 114, the additional resources may refer only to the additional processing units 122. However, for purposes of illustration, the DSFs 124 are shown as being included in the additional resources 120 in FIG. 1.

The DBMS 102 may store a resource management module (RMM) 126. The RMM 126 may be executed by the processor 104. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors.

The RMM 126 may include one or more sub-modules that are executed to perform various tasks. In one example, the RMM 126 may include a database resource detection module (DRDM) 128. The database resource detection module (DRDM) 128 may detect when adjustment of available resources of the database system 100, such as the addition and removal of resources, as indicated by the resource adjustment detection indicator 130. In one example, the resource adjustment indicator 130 may represent a message generated by the network 110 upon connection or removal of the additional resources 120. One or more messages may be generated when multiple resources are added or removed. In alternative examples, the resource adjustment indicator 130 may be any suitable indication that informs the database management system 102 that resources have been added or removed from connection with the network 110. Detection of the addition or removal of resources from the database system 100 may be automatically detected by the DRDM 128 or may be detected based on user indication of the adjustment of resources.

Upon detection of the additional resources 120 being added to the database system 100, the RMM 126 may determine if redistribution of existing database information stored in the database system 100 is desired. Redistribution may be advantageous in allowing additional processing units 122 to process data along with the processing units 112 already available, which may provide faster response times to various queries and/or workloads provided to the database system. Various factors may be evaluated whether redistribution should occur.

In one example, the RMM 126 may include a redistribution evaluation module (REM) 132. The REM 132 may evaluate various factors, such as those related to both the additional resources 120, as well as the characteristics of the database information identified for potential redistribution. Once redistribution is determined, the database information selected for redistribution may be redistributed in accordance with the determination of the REM 132.

In FIG. 1, the REM 132 has determined to redistribute table T1. The REM 132 may transmit a redistribution instruction set 134 to the processing units 112 and 122. The redistribution instruction set 134 may be distributed to each of the processing units 112 that contain portions of table T1 to be redistributed such that the processing units 112 can retrieve the rows of table T1 to be redistributed. The redistribution instruction set 134 may also be distributed to the additional processing units 122 selected for receiving rows of the table T1. In one example, the redistribution instruction set 134 may be sent to specific processing units 112 and additional processing units 122 involved with table redistribution. In alternative examples, the redistribution instruction set 134 may be sent globally such that each processing unit 112 and additional processing unit 122 receives the redistribution instruction set 134, but only acts if the instruction set 134 has relevance to corresponding tables.

Figure 2:
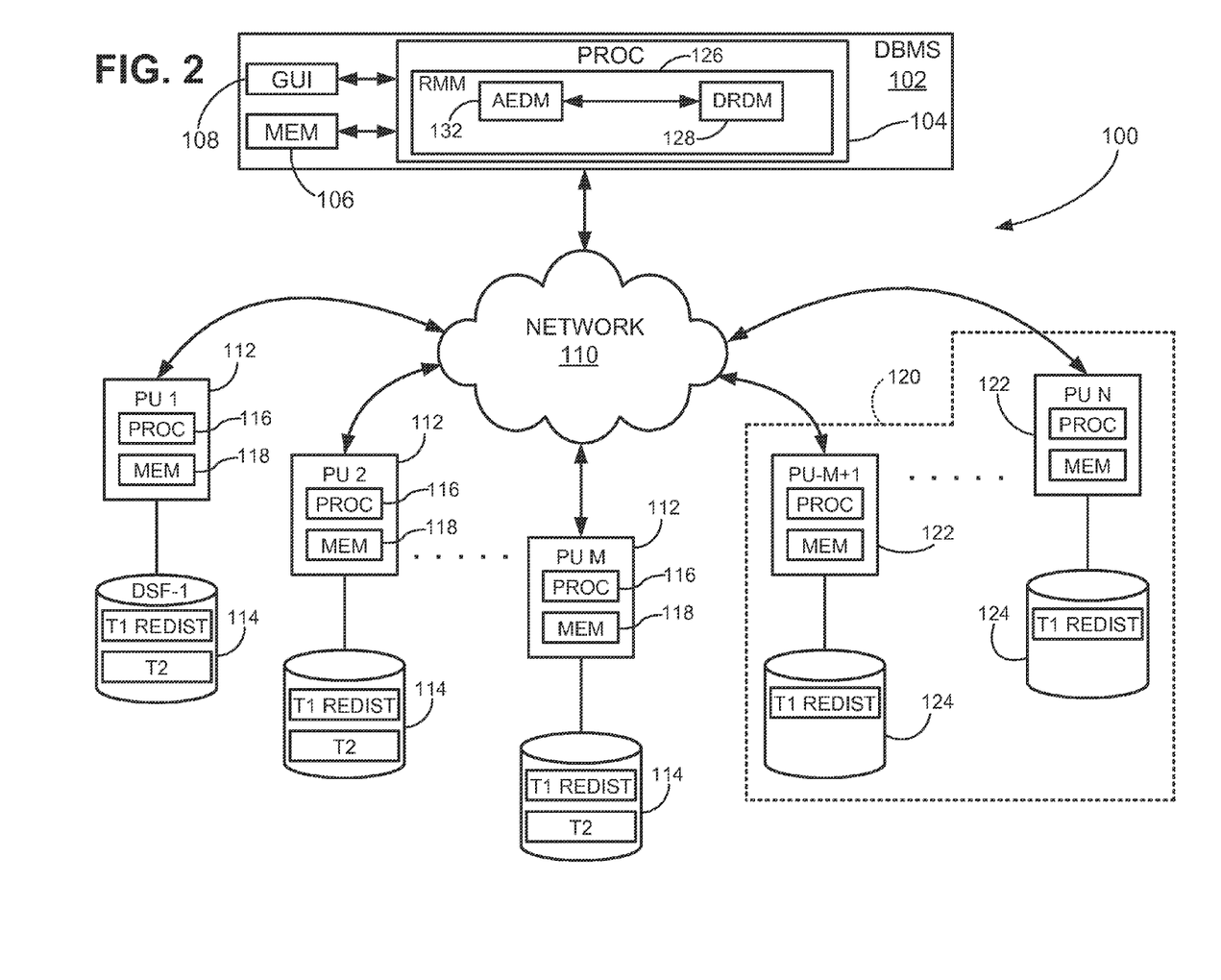
FIG. 2 is a block diagram of the example database system of FIG. 1 with additional resources.

FIG. 2 shows a state of the database system 100 after redistribution has occurred. As shown in FIG. 2, table T1 has been redistributed to the additional resources, while also altering the rows of table T1 stored by the processing units 112. In FIG. 2, table T2 has been considered for redistribution but has not been redistributed.

Figure 3:
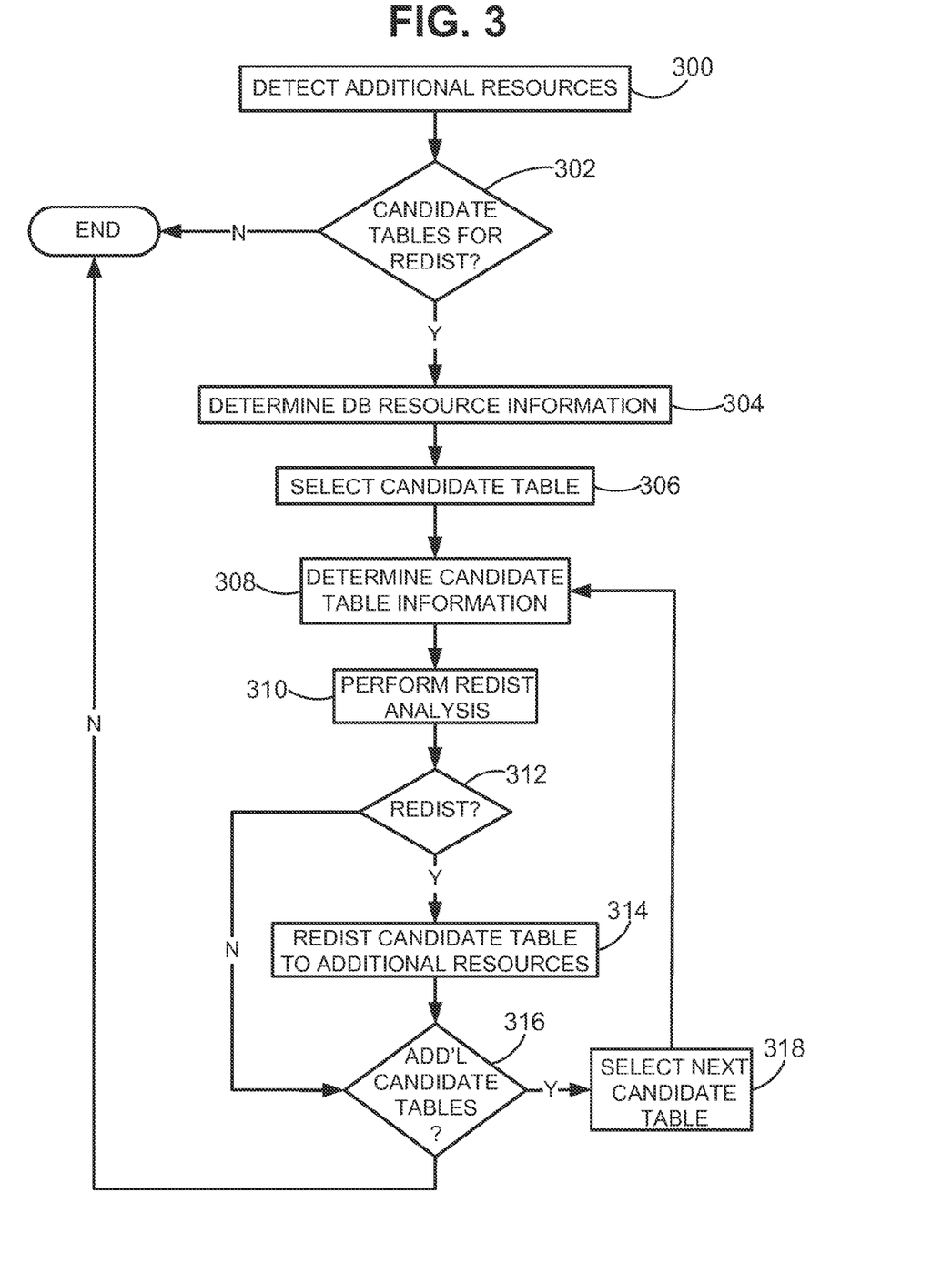
FIG. 3 is an operation flow diagram of a database system implementing additional resources.

FIG. 3 is an operational flow diagram of the RMM 126 of the database system 100. In one example, the RMM 126 may detect the presence of additional resources provided to the database system 100 (300), such as through the DRDM 128.

Detection may occur automatically upon connection of the additional resources 120 to the database system 100 or may occur through user-based indication. Upon detection of the additional resources 120, the RMM 126 may determine if database tables stored in the database information are candidates for redistribution (302). This determination may be accomplished through various manners. In one example, each table may be identified upon creation or during existence that each table would be an appropriate candidate for redistribution. Various considerations may be used to determine that a table is a candidate for redistribution. In one example, heuristics may be applied such that each table is evaluated. In other examples, tables may be preselected as candidates for redistribution or each table may be considered for redistribution, thus eliminating the determination of candidate tables.

Upon determination that candidate tables for redistribution exist, the REM 132 may determine information about the database resources, including the additional resources 120 (304). In one example, tables stored in the DSFs 114 and 124 may be hash partitioned data, such as that used in relational tables. In such a configuration, the REM 132 may consider various parameters regarding the resources of the database. For example, the REM 132 may consider the number of processing units 112 and the number of the additional processing units 122. The REM 132 may also consider the duration of time that the additional processing units 122 may be available.

Upon determination of the database resource information, the REM 132 may select a candidate table for redistribution (306). The selection may be a random selection for the tables identified as candidates for redistribution or may be ordered based on various considerations, such as table characteristics, such as size, data type, etc. Upon selection of a candidate table, the REM 132 may determine information about the candidate table (308). The REM 132 may determine various types of information, such as characteristics of the candidate table. In one example, for database tables storing hash partitioned data, the REM 132 may determine information such as: the frequency of index join or full table scan (FTS) access for the candidate table; the cost to read a row of the candidate table; the cost to write a row of the candidate table; and the cardinality of the candidate table. The cost to read a row of the candidate table and write to a row of the candidate table may be based in time, e.g., cost refers to the amount of time it takes to write to or read a row of the candidate table.

Upon determination of the candidate table information, the REM 132 may perform a redistribution analysis to determine if the candidate table should be redistributed to the additional resources 120 (310). In one example, the redistribution analysis may be a cost-benefit analysis, where the cost (in time) of redistribution is compared to the benefit (in time). In one example, the cost associated with redistributing table in the database system 100 may be defined as:

$$\text{Cost} = \frac{R*|T|}{N1} + \frac{R*|T|}{N2} = R*|T|*\left(\frac{1}{N1} + \frac{1}{N2}\right) = (N1+N2)*\frac{R*|T|}{N1*N2} \quad \text{Eqn. 1}$$

where:
N1=number of processing units in the database system excluding additional processing units;
N2=number of processing units in the database system including additional processing units;
R=cost to read a row to a candidate table;
|T|=cardinality of the candidate table.

The relationship between N2 and N1 may be represented as:

$$N2=\mu*N1 \quad \text{Eqn. 2}$$

where μ is the ratio of N2/N1. Eqn. 1 assumes that the cost to read a row of the candidate table equals the cost to write a row to the candidate table, however this may be generalized. Thus, costs that arise due to redistributing hash-partitioned data may include reading a candidate table on N1 processing units and redistributing the table. Costs may also arise from, if rows being inserted or replacing other rows are sorted, merging the candidate table on the processing units including the additional processing units—no input/output (I/O) to and from the tables is involved. Costs may also arise from writing the candidate table on N2 processing units.

The benefit associated with redistributing the candidate table may be defined as:

$$\text{Benefit} = \left(\frac{R*|T|}{N1} - \frac{R*|T|}{N2}\right)*NA = (N2-N1)*R*|T|*\frac{NA}{N1*N2} \quad \text{Eqn. 3}$$

where NA=frequency of index join or FTS access * duration of the expected time the additional resources are available. Accordingly, the REM 132 may determine that redistribution is appropriate when benefit>cost, such that:

$$(N2-N1)*R*|T|*\frac{NA}{N1*N2} > (N1+N2)*\frac{R*|T|}{N1*N2} \quad \text{Eqn. 4}$$

which simplifies to:

$$(N2-N1)*NA > (N1+N2) \quad \text{Eqn. 5}$$

Or $$NA > (N1+N2)/(N2-N1) \quad \text{Eqn. 6}$$

N2 may be expressed is μ*N1, where u is the ratio of N2/N1. Substituting Eqn. 2 into Eqn. 5 provides:

$$NA > (\mu+1)/(\mu-1) \quad \text{Eqn. 7}$$

Based on the relationship in Eqn. 6, as an example, if the additional resources 120 provided a 10% upgrade of the currently available resources, such as the processing units 112, Eqn. 6 is reduced to NA>21. In other words, the table considered for redistribution would require accessing at least twenty-one times during the upgraded duration for the benefit of redistribution to outweigh the cost.

In one example, a predetermined threshold may be used in order to determine if a table is to be redistributed. The result of Eqn. 6 may be determined for a candidate table resulting in a number of table accesses required for the benefit of redistribution to be greater than the cost. This number of accesses may be compared to a threshold amount. If the number is greater than the threshold amount, the candidate table may be redistributed. The predetermined threshold may be global in nature or a number of predetermined thresholds may be used on a table-by-table basis.

In alternative examples, different data partitioning may be used such as randomly partitioned data. In one example, such a scheme may distribute rows from existing instances to new ones upon upgrade of additional resources to make a copy and discard it when the additional resources are surrendered. The cost may be defined as:

$$\text{Cost} = R*|T|\left(\frac{1}{N1} - \frac{1}{N2}\right) + 2*\frac{W*|T|}{N2} = R*|T|/N1 \quad \text{Eqn. 8}$$

where W=cost to write a row to a candidate table. If it is assumed that writes of a row can proceed simultaneously with reads of rows, the cost becomes:

$$Cost=R*|T|/N2 \quad \text{Eqn. 9}$$

A cost benefit analysis may be expressed as:

$$(N2-N1)*R*|T|*NA/(N1*N2) > R*|T|/N2 \quad \text{Eqn. 10}$$

which simplifies to:

$$(N2-N1)*NA > N1 \quad \text{Eqn. 11}$$

Or $$NA > N1/(N2-N1) \quad \text{Eqn. 12}$$

where using the relationship $N2=\mu*N1$ provides:

$$NA > 1/(\mu-1) \quad \text{Eqn. 13}$$

Thus, as an example, for a 10% upgrade, a table must be accessed at least 10 times for the redistribution to provide a benefit greater than the cost.

In the randomly-partitioned example, costs double if instead of making a copy, data is re-redistributed back into the original distribution. Such considerations should be weighed against making updates while a copy is extant and additional memory space tradeoffs.

Other alternative examples may implement a hybrid approach, where data is initially maintained using hash partitioning, excepting permanent upgrades, it is cached in a randomly partitioned way. In such a configuration, full table scans can leverage the added parallelism but the index joins and other index accesses can go the original data set.

Upon determining the candidate table is to be redistributed, the table may be redistributed to the additional resources (314). Once redistribution has occurred or the candidate table is not to be redistributed, presence of additional candidate tables is determined (316). If additional candidate tables exist, the next candidate table is selected (318) to determination if redistribution is to occur. If no additional candidate tables exist, the activity by the RMM 126 may cease until being reactivated.

Figure 4:
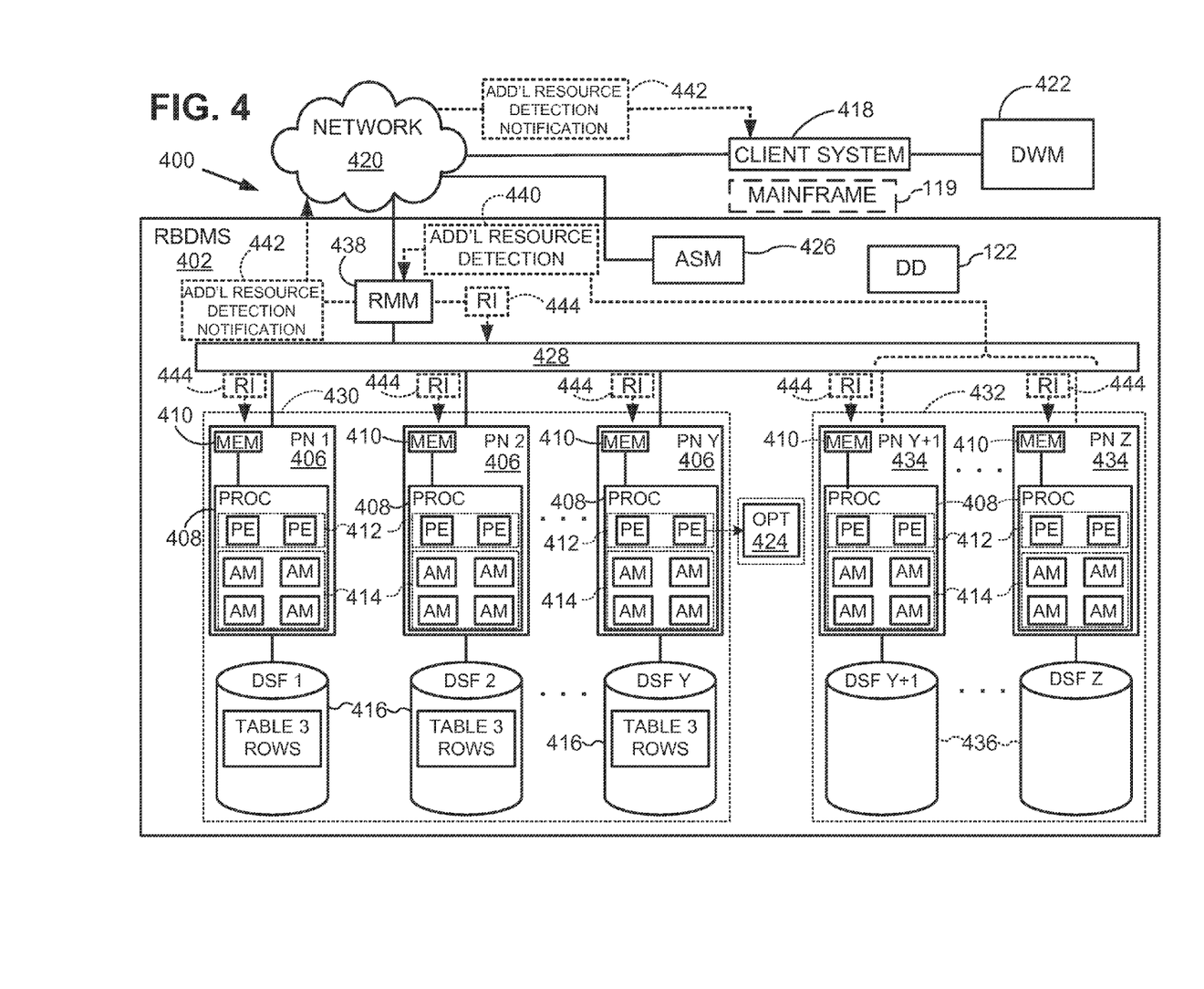
FIG. 4 is a block diagram of another example database system.

FIG. 4 is a diagrammatic representation of example architecture for a database system 400, such as a Teradata Active Data Warehousing System®, that is suited for redistributing data of a database to additional resources. The database system 400 may include a relational database management system (RDBMS) 402 that implements a parallel-processing environment to carry out database management. The RDBMS 402 may be a combination of software (e.g., computer program routines, subroutines, applications, etc.) and hardware (e.g., processors, memory, etc.). In the example of FIG. 1, the RBDMS 402 may be a massive parallel processing (MPP) system having an array of processing units and distributed memory. In alternative examples, the RBDMS 402 may implement a single processing unit, such as in a symmetric multiprocessing (SMP) system configuration.

The RBDMS 402 may include one or more processing units used to manage the storage, retrieval, and manipulation of data in the data-storage facilities. The array of processing units may include an array of processing nodes 406 that manage the storage, retrieval, and manipulation of data included in a database. In FIG. 4, the processing nodes 406 are individually indexed as PN 1 through PN Y, where Y may represent the total number of processing nodes 406 in the database system 400 or, alternatively, may represent the total number of active processing nodes 406 in the database system.

In one example, each processing node 406 may include one or more physical processors 408 and memory 410. The processing nodes 406 may include one or more other processing unit arrays such as parsing engine (PE) modules 412 and access modules (AM) 414. The access modules 110 may be access modules processors (AMPs), such as those implemented in the Teradata Active Data Warehousing System®. The parsing engine modules 108 and the access modules 110 may each be virtual processors (vprocs) and/or physical processors. In the case of virtual processors, the parsing engine modules 412 and access modules 414 may be executed by one or more physical processors, such as those that may be included in the processing nodes 406. For example, in FIG. 1, each parsing engine module 412 and access module 110 is associated with a respective processing node 406 and may each be executed as one or more virtual processors by physical processors 408 included in the respective processing node 406. In FIG. 4, each processing node 406 is shown as including multiple parsing engine modules 412 and access modules 414, such that there are more parsing engine modules 412 and access modules 414 than processing nodes 406. In one example, during operation, the one or more physical processors 408 included in the processing nodes 406 may execute the parsing engine modules 412 and access modules 414 by switching between the executions of the various modules at a rapid rate allowing the vprocs to substantially operate in "parallel."

The RBDMS 102 stores data in one or more tables in DSFs 416. The DSF's 416 may be similar to the DSFs 114 described with regard to FIGS. 1 and 2. In FIG. 4, stored data may be partitioned in a row-partitioned format and accessed by the corresponding access modules 412 using the shared-nothing functionality. In one example, a table "Table 3" is distributed across the DSFs 416 and in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to DSFs 416 and associated processing nodes 406 by a hash bucket map. The characteristics of the columns chosen for the primary index determine how evenly the rows are distributed.

Rows of table 3 may be stored across multiple data-storage facilities 416. In FIG. 4, the DSFs 416 are individually designated as DSF 1 through DSF Y where Y is the number of data storage facilities 416 to illustrate correspondence with each processing node 406. Each parsing engine module 412 may organize the storage of data and the distribution of table rows. The parsing engine modules 412 may also coordinate the retrieval of data from the data-storage facilities 406 in response to queries received, such as those received from a client computer system 418 connected to the RBDMS 102 through connection with a network 420. The network 116 may be wired, wireless, or some combination thereof. The network 420 may be a virtual private network, web-based, directly-connected, or some other suitable network configuration. In one example, the client computer system 418 may run a dynamic workload manager (DWM) client 422. Alternatively, the database system 100 may include a mainframe 119 used to interact with the RBDMS 402.

Each parsing engine module 412, upon receiving an incoming database query, may apply an optimizer module (OPT) 424 to assess the best plan for execution of the query. An example of an optimizer module 424 is shown in FIG. 4 with regard to parsing engine module PN Y. Selecting the optimal query-execution plan may include, among other things, identifying which of the processing nodes 406 are involved in executing the query and which database tables are involved in the query, as well as choosing which data-manipulation techniques will serve best in satisfying the conditions of the query.

The RBDMS 402 may include an active system management (ASM) module 426. The ASM module 426 may be implemented as a "closed-loop" system management (CLSM) architecture capable of satisfying a set of workload-specific goals. In other words, the RBDMS 402 is a goal-oriented workload management system capable of supporting complex workloads and capable of self-adjusting to various types of workloads. The ASM module 426 may communicate with each optimizer module 424 (as shown in FIG. 4 for parsing engine module PN Y) and is adapted to convey a confidence threshold parameter and associated parameters to the optimizer module 424 in communication. Further, the ASM module 426 may communicate with each parsing engine module 108 to receive query execution plan costs therefrom, and to facilitate query exception monitoring and automated modifications of confidence threshold parameters in accordance with disclosed embodiments. Further, the DWM client 422 may communicate with the ASM module 426 via the network 420.

The ASM module 426 operation has four major phases: 1) assigning a set of incoming request characteristics to workload groups, assigning the workload groups to priority classes, and assigning goals (referred to as Service Level Goals or SLGs) to the workload groups; 2) monitoring the execution of the workload groups against their goals; 3) regulating (e.g., adjusting and managing) the workload flow and priorities to achieve the SLGs; and 4) correlating the results of the workload and taking action to improve performance. In accordance with disclosed embodiments, the ASM module 426 is adapted to facilitate control of the optimizer module 424 pursuit of robustness with regard to workloads or queries.

An interconnection 428 allows communication to occur within and between each processing node 406. For example, implementation of the interconnection 428 provides media within and between each processing node 406 allowing communication among the various processing units. Such communication among the processing units may include communication between parsing engine modules 108 associated with the same or different processing nodes 106, as well as communication between the parsing engine modules 412 and the processing modules 414 associated with the same or different processing nodes 406. Through the interconnection 428, the access modules 414 may also communicate with one another within the same associated processing node 406 or other processing nodes 406.

The interconnection 428 may be hardware, software, or some combination thereof. In instances of at least a partial-hardware implementation the interconnection 428, the hardware may exist separately from any hardware (e.g., processors, memory, physical wires, etc.) included in the processing nodes 406 or may use hardware common to the processing nodes 406. In instances of at least a partial-software implementation of the interconnection 428, the software may be stored and executed on one or more of the memories 410 and processors 408 of the processor nodes 406 or may be stored and executed on separate memories and processors that are in communication with the processor nodes 406. In one example, interconnection 428 may include multi-channel media such that if one channel ceases to properly function, another channel may be used. Additionally or alternatively, more than one channel may also allow distributed communication to reduce the possibility of an undesired level of communication congestion among processing nodes 406.

In FIG. 4, the database system 400 may include initial resources 430 that may include processing nodes PN 1 through PN Y and data storage facilities DSF 1 through DSF Y. Additional resources 432 may be connected to the database system 400. The additional resources 432 may include additional processing nodes 434, individually designated as PN Y+1 through PN Z, and additional data storage facilities 436, individually designated as DSF Y+1 through DSF Z. In one example, the RBDMS 402 may include a resources management module (RMM) 438. The RMM 438 may detect when additional resources, such as the additional resources 432 are initially connected to the database system 400 and available for use.

Upon detection of the availability of the additional resources, illustrated through additional resource detection 440, the RMM 438 may generate an additional resource detection notification 442, which may be received by the client system 418. In one example, the additional resource detection notification 442 may indicate that the detection of additional resources has occurred and, once transmitted to the client system 418, the RMM 438 may automatically begin analyzing database tables in order to determine if redistribution is to occur. In alternative examples, the RMM 438 may transmit the additional resource detection notification 442 to the client system 418 and await further instruction before proceeding with any determinations regarding table redistribution.

In FIG. 4, rows of table 3 are distributed among the DSFs 416. In FIG. 4, table 3 is shown as being distributed among all of the DSFs 416 for ease of illustration. In other examples, rows of table 3 may be distributed among less than all of the DSFs 416. The RMM 438 may determine if table 3 is to be redistributed to the additional resources 432. If determination is deemed appropriate, such as through the cost-benefit analysis previously discussed, redistribution may take place. In FIG. 4, a redistribution instruction set (RI) 444 is issued by the RMM 438, which may be distributed to all processing nodes 406 having access modules 414 associated with rows of table 3, which may include processing nodes 406 already having access modules associated with rows of table 3, as well as the additional processing nodes 434 selected to have access modules 414 associated with rows due to the redistribution of table 3. In one example, one RMM 438 may transmit the redistribution instruction set 444 directly to each processing node 406 and each additional processing node 434 allowing the processing nodes 406 and additional processing nodes 434 to process the redistribution plan 444 and direct the relevant access modules 414 to transmit and receive appropriate rows amongst themselves in order to carry out the redistribution. In other examples, the redistribution plan 444 may be received by a single parsing engine module 412 of one of the processing nodes 406, which may transmit appropriate instructions to each relevant access module in order to carry out redistribution.

Figure 5:
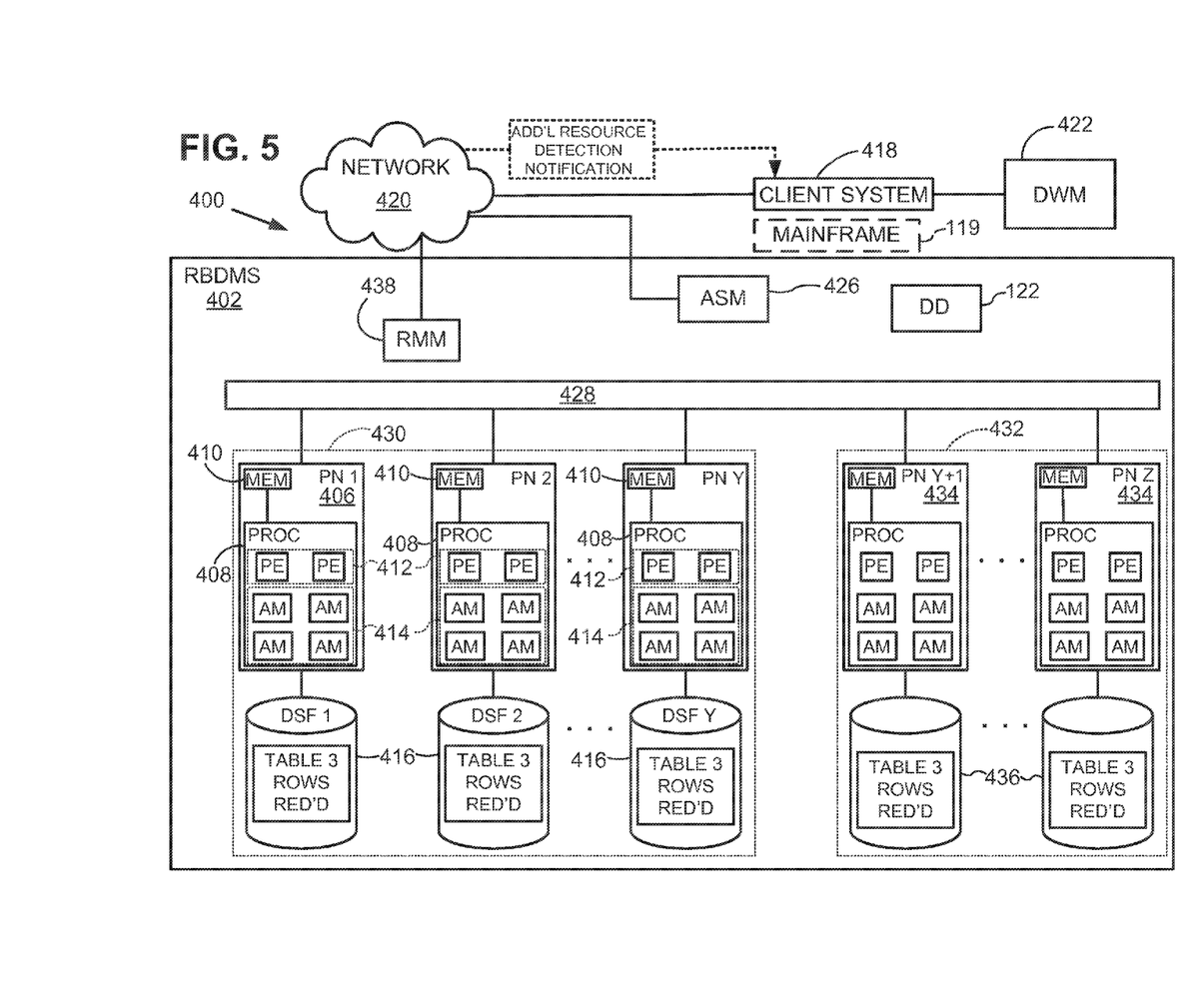
FIG. 5 is a block diagram of the example database system of FIG. 4 with additional resources.

FIG. 5 shows the condition of the database system 400 after redistribution of the table T3. In FIG. 5, the redistribution plan 444 has been processed allowing the access modules 414 to retrieve and/or process rows involved in the redistribution. Table 3 is redistributed onto the additional DSFs 436 that correspond to the additional processing nodes 434. In FIG. 5, for ease of illustration, each additional processing node 434 is shown as including access modules 414 associated with rows of redistributed table 3. Redistribution may include less than all additional processing nodes 434 and/or less than all access modules of the additional processing nodes.

The term "memory" or "memories" as used herein may include one or more memories and may be computer-readable storage media or memories, such as a cache, buffer, RAM, removable media, hard drive, flash drive or other computer-readable storage media. Computer-readable storage media may include various types of volatile and nonvolatile storage media. The term "processor" or "processors" as used herein may include various processing techniques that may be implemented by the processors such as multiprocessing, multitasking, parallel processing and the like, for example.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A resource management tool for a database system, the resource management tool comprising:
   a memory device; and
   a processor in communication with the memory device, the processor configured to:
   detect availability of additional database resources to the database system in response to addition of the additional database resources to the database system, wherein the additional database resources include at least one of additional processing resources and additional storage resources;
   identify a database object associated with original database resources of the database system to be redistributed from the original database resources to the additional database resources, wherein the original database resources include at least one of processing resources and storage resources;
   determine presence of at least one condition associated with at least one of the additional database resources and the identified database object; and
   redistribute at least a portion of the database object from the original database resources to the additional database resources in response to the presence of the at least one condition, wherein the redistribution disassociates the at least a portion of the database object from the original database resources and associates the at least a portion of the database object with the additional database resources.

2. The resource management tool of claim 1, wherein the at least one condition is associated with a ratio of additional database resources to a combination of the additional database resources and the original database resources.

3. The resource management tool of claim 2, wherein:
   the original database resources comprise a first plurality of processing units;
   the additional database resources comprise a second plurality of processing units; and
   the at least one condition comprises a ratio of a number of the second plurality of processing units to a sum of the number of the second plurality of processing units and a number of the first plurality of processing units.

4. The resource management tool of claim 3, wherein:
   the identified database object is a database table; and
   the at least one condition is further associated with an expected number of accesses of the database table.

5. The resource management tool of claim 4, wherein the predetermined condition is the expected number of accesses of the database table being greater than:

$$\mu+1/\mu-1$$

where $\mu$ is the ratio of the number of the second plurality of processing units to the sum of the number of the second plurality of processing units and the number of the first plurality of processing units.

6. The resource management tool of claim 1, wherein the identified database object is a database table, and wherein the processor is further configured to generate a signal indicative of detection of the presence of the at least one condition.

7. The resource management tool of claim 6, wherein the processor is further configured to:
   transmit, to a user interface, the signal indicative of detection of the presence of the at least one condition;
   receive a second signal from the user interface; and
   redistribute at least a portion of the database table from the original database resources to the additional database resources in response to receipt of the second signal from the user interface.

8. A method of managing resources for a database system stored in a memory device, the method comprising:
   detecting, with a processor, availability of additional database resources to the database system comprising original database resources in response to addition of the additional database resources to the database system, wherein the additional database resources include at least one of additional processing resources and additional storage resources;
   identifying, with the processor, database information associated with the original database resources of the database system to be redistributed from the original database resources to the additional database resources, wherein the original database resources include at least one of processing resources and storage resources;
   determining, with the processor, presence of at least one condition associated with at least one of the additional database resources and the identified database information; and
   redistributing, with the processor, at least a portion of the database information from the original database resources to the additional database resources in response to the determination of the at least one condition, wherein the redistribution disassociates the at least a portion of the database object from the original database resources and associates the at least a portion of the database object with the additional database resources.

9. The method of claim 8, wherein the determining, with the processor, the presence of the at least one condition comprises:
   determining, with the processor, a cost value associated with redistributing the at least a portion of the database information;
   determining, with the processor, a benefit value associated with redistributing the at least a portion of the database information; and
   determining, with the processor, when the benefit value is greater than the cost value.

10. The method of claim 9, wherein:
    the original database resources comprise a first plurality of processors and the additional database resources comprise a second plurality of processors;
    identifying, with the processor, database information associated with the original database resources of the database system to be redistributed comprises identifying, with the processor, a database table associated with the original database resources of the database system to be redistributed; and determining, with the processor, the cost value comprises determining, with the processor, the cost value based on at least one of a number of the first plurality of processors, a number of the second plurality of processors, a cost value associated with reading a row of the database table, and cardinality of the database table.

11. The method of claim 9, wherein:

the original database resources comprise a first plurality of processors and the additional database resources comprise a second plurality of processors;

identifying, with the processor, database information associated with original database resources of the database system to be redistributed comprises identifying, with the processor, a database table associated with the original database resources of the database system to be redistributed; and determining, with the processor, the benefit value comprises determining, with the processor, the benefit value based on at least one of the first plurality of processors, the second plurality of processors, a cost value associated with reading a row of the database table, cardinality of the database table, and an access value indicative of an amount of expected accesses of the database table.

12. The method of claim 8, wherein:

the original database resources comprise a first plurality of processors and the additional database resources comprise a second plurality of processors; and determining, with the processor, presence of the at least one condition comprises determining, with the processor, a ratio of the second plurality of processors to a combination of the first plurality of processors and the second plurality of processors.

13. The method of claim 12, wherein:

identifying, with the processor, database information associated with original database resources of the database system to be redistributed comprises identifying, with the processor, a database table associated with the original database resources of the database system to be redistributed; and determining, with the processor, presence of at least one condition further comprises determining, with the processor, when an expected number of accesses of the database table is greater than:

$1/(\mu-1)$ where $\mu$ is the ratio of the number of the second plurality of processing units to the sum of the number of the second plurality of processing units and the number of the first plurality of processing units.

14. The method of claim 8 further comprising:

receiving, with the processor, indication that at least a portion of the additional resources are to become unavailable; and redistributing, with the processor, the database information from the at least a portion of the additional resources to at least one of the original database resources and available additional resources in response to the indication that at least a portion of the additional resources are to become unavailable.

15. A non-transitory computer-readable medium encoded with a plurality of instructions executable by a processor, the plurality of instructions comprising:

instructions to detect presence of additional database resources added to a database system comprising original database resources in response to addition of the additional database resources to the database system, wherein the additional database resources include at least one of additional processing resources and additional storage resources;

instructions to identify database information associated with the original database resources of the database system to be redistributed from the original database resources to the additional database resources, wherein the original database resources include at least one of processing resources and storage resources;

instructions to determine presence of at least one condition associated with at least one of the additional database resources and the identified database information; and instructions to distribute at least a portion of the database information from the original database resources to the additional database resources in response to the determination of the at least one condition, wherein the distribution disassociates the at least a portion of the database object from the original database resources and associates the at least a portion of the database object with the additional database resources.

16. The non-transitory computer-readable medium of claim 15, wherein the instructions to determine the presence of the at least one condition comprise:

instructions to determine a cost value associated with redistributing the at least a portion of the database information;

instructions to determine a benefit value associated with redistributing the at least a portion of the database information; and instructions to determine, with the processor, when the benefit value is greater than the cost value.

17. The non-transitory computer-readable medium of claim 16, wherein:

the original database resources comprise a first plurality of processors and the additional database resources comprise a second plurality of processors;

the instructions to identify database information associated with the original database resources of the database system to be redistributed comprise instructions to identify a database table associated with the original database resources of the database system to be redistributed; and the instructions to determine a cost value comprise instructions to determine the cost value based on at least one of a number of the first plurality of processors, a number of the second plurality of processors, a cost value associated with reading a row of the database table, and cardinality of the database table.

18. The non-transitory computer-readable medium of claim 16, wherein:

the original database resources comprise a first plurality of processors and the additional database resources comprise a second plurality of processors;

the instructions to identify database information associated with the original database resources of the database system to be redistributed comprise instructions to identify a database table associated with the original database resources of the database system to be redistributed; and the instructions to determine the benefit value comprise instructions to determine the benefit value based on at least one of the first plurality of processors, the second plurality of processors, a cost value associated with reading a row of the database table, cardinality of the database table, and an access value indicative of an amount of expected accesses of the database table.

19. The non-transitory computer-readable medium of claim 16, wherein:
- the original database resources comprise a first plurality of processors and the additional database resources comprise a second plurality of processors; and
- the instructions to determine the presence of at least one condition further comprise determining, with the processor, when the expected number of accesses of the database table is greater than:

$$\mu+1/\mu-1$$

where $\mu$ is the ratio of the number of the second plurality of processing units to the sum of the number of the second plurality of processing units and the number of the first plurality of processing units.

20. The non-transitory computer-readable medium of claim 15, wherein the plurality of instructions further comprises:
- instructions to determine that at least a portion of the additional resources are to become unavailable; and
- instructions to redistribute the database information from the at least a portion of the additional resources to at least one of the original database resources and available additional resources in response to the determination that the at least a portion of the additional resources are to become unavailable.

* * * * *